US006950053B1

(12) United States Patent
Peterson

(10) Patent No.: US 6,950,053 B1
(45) Date of Patent: Sep. 27, 2005

(54) MOTORCYCLE MOUNTED RADAR/LASER DETECTOR

(75) Inventor: Daniel John Peterson, 1522 Delaware Ave. #2, Ames, IA (US) 50014

(73) Assignee: Daniel John Peterson, Marion, IA (US)

(*) Notice: Subject to any disclaimer, the term of this patent is extended or adjusted under 35 U.S.C. 154(b) by 0 days.

(21) Appl. No.: 10/795,484

(22) Filed: Mar. 9, 2004

Related U.S. Application Data

(60) Provisional application No. 60/452,100, filed on Mar. 6, 2003.

(51) Int. Cl.$^7$ .............................. H04K 3/00; G01S 7/00

(52) U.S. Cl. ........................... 342/20; 342/13; 342/52; 342/53; 342/54; 342/89; 342/175; 342/176; 342/195; 398/202; 398/212

(58) Field of Search ........................... 340/425.5, 463, 340/933, 936, 942; 342/13–20, 89, 175, 176–197, 342/52–54; 73/488; 356/28, 73, 213–236; 455/226.1–229; 398/202–214

(56) References Cited

U.S. PATENT DOCUMENTS

| | | | | |
|---|---|---|---|---|
| 3,924,232 A | * | 12/1975 | Burdi et al. | 342/54 |
| 4,346,992 A | * | 8/1982 | Schwartz | 356/73 |
| 4,723,314 A | * | 2/1988 | Schneeberger | 398/204 |
| 5,525,989 A | * | 6/1996 | Holt | 342/20 |
| 5,666,120 A | * | 9/1997 | Kline et al. | 342/20 |
| 5,781,145 A | * | 7/1998 | Williams et al. | 342/20 |
| 5,990,821 A | * | 11/1999 | Sakar | 342/54 |
| 6,297,732 B2 | * | 10/2001 | Hsu et al. | 342/20 |
| 6,384,776 B1 | * | 5/2002 | Martin | 342/20 |
| 6,583,750 B2 | * | 6/2003 | Shin | 342/20 |
| 6,587,068 B2 | * | 7/2003 | Kuhn et al. | 342/20 |
| 6,670,905 B1 | * | 12/2003 | Orr | 342/20 |

* cited by examiner

Primary Examiner—Bernarr E. Gregory

(57) ABSTRACT

A radar and laser detection device for mounting upon a motorcycle is described which provides increased concealment, security, safety, ease of use and functionality specific to the needs of motorcycle drivers. A method of semi-permanently mounting the device is described which requires no permanent alterations to the vehicle while providing improved visibility of alarm signals, a simple display technique, and controls which do not require the operator to remove his/her hands from the vehicle handlebars.

3 Claims, 3 Drawing Sheets

MOTORCYCLE MOUNTED RADAR/LASER DETECTOR

CROSS-REFERENCE TO RELATED APPLICATIONS

The following is a non-provisional continuation of provisional application No. 60/452,100, filed 6 Mar. 2003. Thus this provisional application is referenced in its entirety.

STATEMENT REGARDING FEDERALLY SPONSORED RESEARCH OR DEVELOPMENT

Research and/or development not federally funded—inventor retains full rights to patent.

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to a radar wave and laser detection system designed and implemented for modular, safe, secure and efficient use when installed upon a motorcycle.

Many unique methods to warn a driver of the presence of speed detecting radar and laser waves are currently in use. For example, U.S. Pat. No. 4,719,462 describes a radar detection helmet to be worn by the driver. Correspondingly, U.S. Pat. No. 5,034,747 discloses a detachable radar unit for a helmet. Further, U.S. Pat. No. 5,114,060 describes a radar detector mounting apparatus for securely mounting a commercially available radar detector unit on either the handlebars or fairing of a motorcycle. Additionally, U.S. Pat. No. 5,781,145 discloses a method and operation of a permanently affixed radar detection unit in the interior of a motorcycle. Finally, U.S. Pat. No. 5,005,661 describes a method for mounting a radar speed monitor in a removable manner to a motorcycle.

Although these many implementations exist, there remain numerous improvements to the functionality, control, efficiency, and security of a motorcycle mounted radar/laser detection unit. Further, the unique operational requirements for a motorcycle driver demand increased ease-of-use of said components to ensure safe operation.

BRIEF SUMMARY OF THE INVENTION

It is an object of the present invention to provide an improved police radar/laser speed detection countermeasure device for mounting specifically to a motorcycle.

The present invention provides controls to the unit in a manner ensuring unimpeded operation of the motorcycle.

The present invention provides a functionality specific to the needs of a motorcycle operator.

The present invention provides increased visibility of alert signals, thus negating the need for audible warning devices which could distract and thus endanger the operator.

The present invention provides automatic adjustment of display settings, thus increasing ease and safety of use.

The present invention describes a weather resistant unit for increased durability and product life.

The present invention will remain in an operational state whenever the vehicle is on, thus protecting the user from inadvertent inactivation.

The present invention provides a means of semi-permanently mounting the unit to a motorcycle, thus increasing security over previous implementations.

The present invention describes a method for mounting upon any vehicle with handlebars, thus it is universally adaptable to all known motorcycle types.

The present invention provides a small, low profile unit which will blend with present motorcycle speed display devices. Thus, the unit will not distract from or clutter the overall appearance of the motorcycle.

The present invention provides a means of mounting requiring no permanent change to the vehicle or any of its parts.

DETAILED DESCRIPTION OF THE INVENTION

Figure 2:
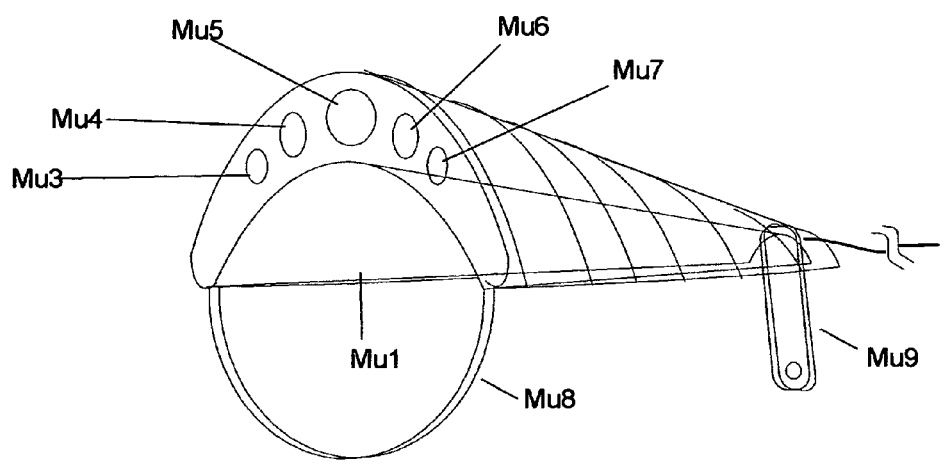
FIG. 2: Main detection unit
  Mu3: Light emitting diode indicating X-band radar detected
  Mu4: Light emitting diode indicating Ka band radar detected
  Mu5: Light emitting diode array containing two diodes:
    Top: Indicates radar signal originated from in front of vehicle
    Bottom: Indicates radar signal originated behind vehicle
  Mu6: Light emitting diode indicating Ka-wideband radar detected
  Mu7: Light emitting diode indicating laser speed detection device found
  Mu8: Thin ring fastener used as optional mounting bracket
  Mu9: Rear brace used as optional mounting bracket

Referring to FIG. 2, Mu1 the main unit of the radar/laser detection device is shown. This unit contains all essential radar/laser detection electronics in a single integrated housing. The detection electronics consist of elements necessary to complete a super heterodyne receiver, with reception frequency centered on the three bands common to police radar units: X, K and Ka-wideband. Further electronics include those necessary to interpret voltage signals from two photoreceptive diodes, with frequency bandwidth extending from 820 to 950 nm. As this receiver is common to such devices and is described extensively in the prior art, a detailed description is not provided here. Extensive descriptions of said heterodyne reception methods may be found in the following U.S. Pat. Nos: 6,507,308; 6,175,324; 6,400,305; and 4,313,216.

Further referring to FIG. 2, Mu1 the main unit of the radar/laser detection device contains a microstrip antenna array which receives the three necessary microwave frequencies: X, K and Ka-wideband. As microstrip antenna arrays of this capability are described extensively in prior literature, an extensive description of the construction is not provided here. Extensive descriptions of said microstrip antenna arrays may be found in the following literature: [1] *Microstrip Antenna Design Handbook*, P. Bhartia, et. al, Artech House, January 2001., [2] *Broadband Microstrip Antennas*, G. Kumar and K. P. Ray, Artech House, November 2003, [3] *Compact and Broadband Microstrip Antennas*, K. Wong, John Wiley and Sons, January 2002, and [4] *Microstrip Antennas: The Analysis and Design of Microstrip Antennas and Arrays*, D. Pozar and D. Schaubert, Wiley-IEEE Computer Society Pr, May 1995.

Further referring to FIG. 2, Mu1 the main unit of the radar/laser detection device will be constructed in such a way that the top of the unit as shown in FIG. 2 will consist of a material such as tinted plastic which will not impede microwaves from reaching the antenna array. Further, said antenna array shall be placed within the device on top of all other circuit boards in such a manner that no other materials or devices block the antenna's ability to collect microwaves from outside the unit. This microstrip antenna array will then be electrically connected to the heterodyne receiving electronics in the same manner as any other form of antenna, as described in previous art.

Figure 1:
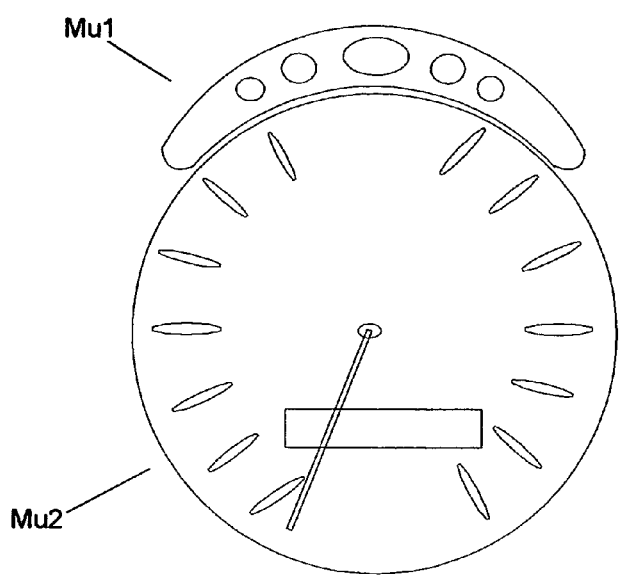
FIG. 1: Main detection unit mounted to motorcycle speedometer
  Mu1: Main detection unit
  Mu2: Motorcycle speedometer

Further referring to FIG. 2, Mu1 the main unit of the radar/laser detection device contains an array of light emitting diodes (LEDs) used to indicate an alarm signal to the operator. The diodes shall be placed on the front of the unit, such as shown in FIG. 2, so that they are highly visible when the unit is mounted as shown in FIG. 1 upon the vehicle speed or RPM indication device. The diode array consists of 4 light emitting diodes of different colors, each diode corresponding to an alarm signal of a detected microwave frequency. Mu3 is used to indicate detection of an X band signal. Mu4 is used to indicate detection of a Ka signal. Mu6 is used to indicate detection of a Ka-wideband signal, and Mu7 is used to indicate detection of a laser signal. The invention further provides safe and unobtrusive operation through the use of a larger, two-color light emitting diode display Mu5 placed in the middle of the indicator array which will alert the driver to the direction of the detected signal—to the front or to the rear.

The present invention further provides additional safe, efficient, and inconspicuous operation through the implementation of a light sensitive electronic circuit within the main detection module Mu1. This light sensitive electronic circuit shall adjust automatically the intensity of the light emitting diode array Mu3 through Mu7, such that it is brighter and therefore easier to see when ambient light is high, and dimmer when ambient light is low. This provides increased safe and efficient operation of the unit such that the driver will not be distracted and forced to avert inappropriate amounts of attention in order to see the display during the day. Further, this feature prevents a loss of light sensitivity during night operation.

FIG. 2, Mu1 shall be constructed in a sealed manner such that all internal components are protected from water. This allows the unit to be placed on the motorcycle speedometer or RPM indicator without fear of inoperability due to weather conditions. This preferred method of mounting thus allows the unit to remain in a fixed, permanent location regardless of weather conditions. Further, this permanent mounting allows for increased security as the unit will be much more difficult to remove than previous methods of mounting radar detection equipment to motorcycles.

Figure 3:
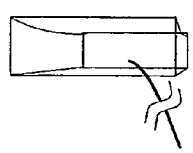
FIG. 3: Rear mounted radar detection device

The present invention provides detection of microwave signals through the use of not only the internal microstrip antenna as described previously, but three external antennas as well. FIG. 3 depicts a horn waveguide antenna, common to the present art in collecting signals in the microwave frequency region of the RF spectrum. This horn waveguide antenna will be enclosed in a sealed package to protect the unit from common external elements such as water and dirt. The horn waveguide antenna shall be constructed such that it allows for collection of the three microwave frequency signals to which the detection unit is sensitive: X, Ka and Ka-wideband.

Figure 4:
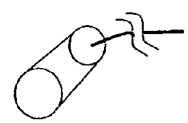
FIG. 4: Laser detection device

The present invention further provides signal detection capabilities through the use of two external laser detection devices. These devices consist of photo-sensitive diodes which are sensitive to light waves in the region between 820 and 950 nm. As above, these diodes will be packaged such that they are resistant to water and other contaminants such as dirt. FIG. 4 depicts a miniature package which contains one of these photo-sensitive diodes.

These three external antennas, one of the type shown in FIG. 3 and two of the type in FIG. 4, are optional to the invention. As such, an operator may decide to mount zero, one, two, or all three of the external antennas and the invention shall continue to operate normally in either case, but with limited functionality. For instance, if the operator decides to mount and/or electrically connect none of the external antennas, the main detection unit will continue to operate normally. However, as only the internal antenna array will be in use, the invention will not be sensitive to laser speed detection devices. Further, in this configuration, only the top half of the diode array Mu5 will operate, as the invention will not have directional capability. If only the second microwave detection unit, FIG. 3 is mounted at the rear of the vehicle, the invention will now achieve directional sensitivity, but still not laser detection capability. Likewise, if only one laser detecting device FIG. 4 is installed, the invention will not have directional capability when a laser detection signal is present. Various other configurations are possible, but the idea of continued, but limited, operation has been made clear.

Figure 5:
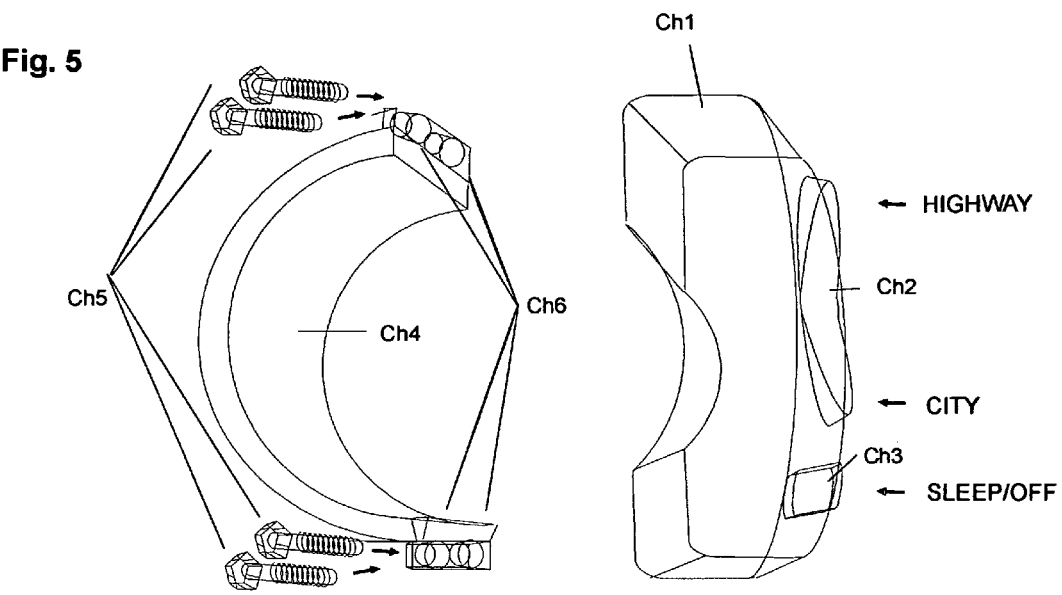
FIG. 5: Control housing
  Ch1: Main control housing
  Ch2: Switch used to shift from Highway to City detection sensitivity and vice versa
  Ch3: Button used to temporarily shut off light emitting diode array if pressed quickly, and completely turn off system until vehicle restart if pressed and held for three seconds
  Ch4: Control housing mounting bracket
  Ch5: Control housing mounting screws
  Ch6: Control housing holes for inserting screws Ch5
Figure 6:
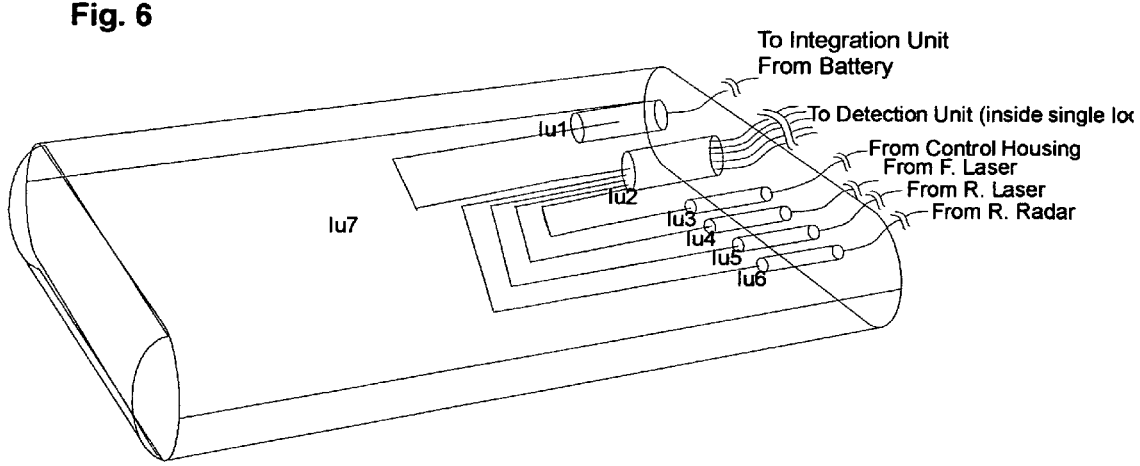
FIG. 6: Integration unit
  Iu1: Plug for power from the vehicle electrical system
  Iu2: Plug for wire loom going from the integration unit to the main detection unit
  Iu3: Plug for connection from control housing
  Iu4: Plug for connection to laser detection device mounted on the front of the vehicle
  Iu5: Plug for connection to laser detection device mounted on the rear of the vehicle
  Iu6: Plug for connection to microwave detection device mounted on the rear of the vehicle
Figure 7:
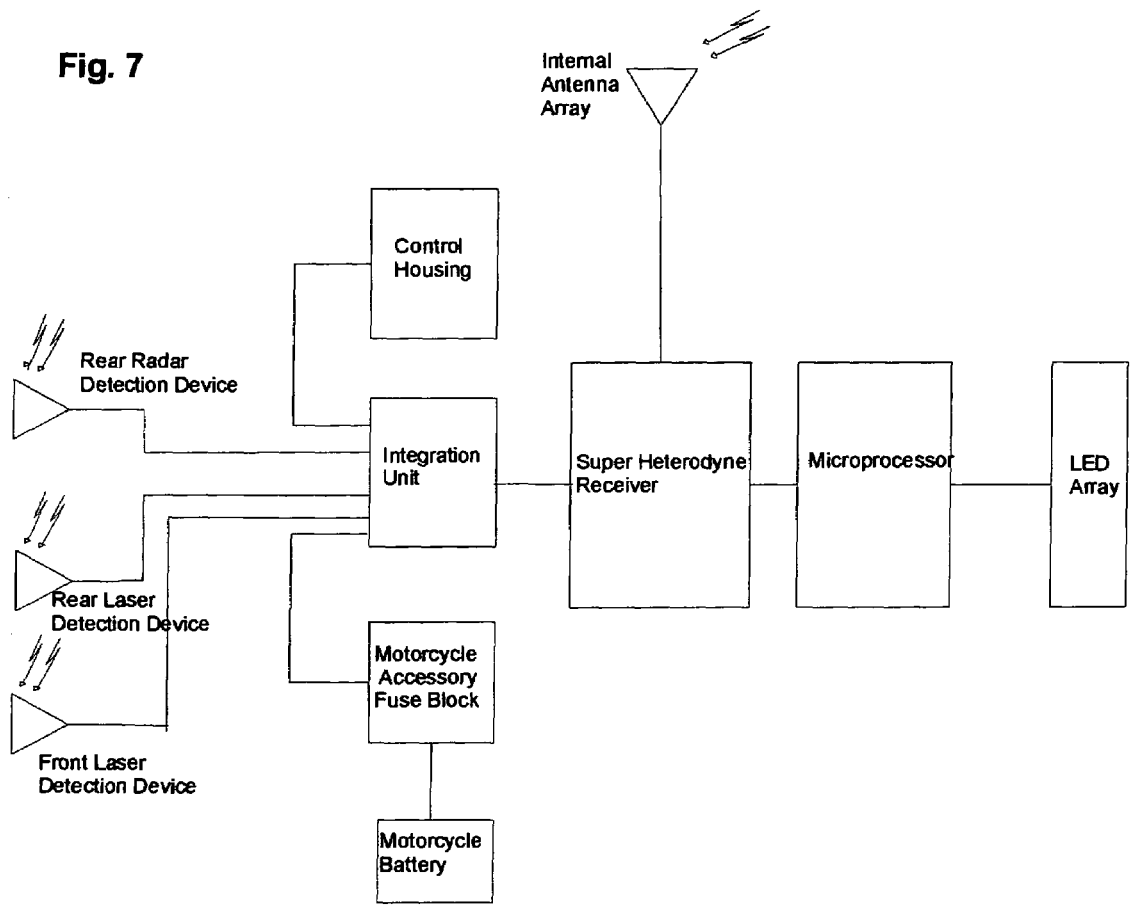
FIG. 7: Functional block diagram of invention circuitry. This drawing depicts the general flow of electrical signals from the antennas, through the integration unit, to the receiver unit. The signals are then interpreted and measured by the microprocessor and a signal is given at the light emitting diode array.

As a signal is detected in one of the three external antennas, an electrical signal travels from the antenna to a small, concealed integration unit, FIG. 6, Iu7. This integration unit collects the electrical signals from all external antennas, as well as power from a connection to the vehicle electrical system. Iu1 is a connection to the vehicle electrical system. This connection may consist of a direct connection from an accessory slot on the vehicle fuse module, a connection in parallel with the ignition control system, a connection in parallel with the headlight circuit, or some other connection which allows the necessary power to become available at all times when the vehicle is running, but only when the vehicle is running. Iu2 is an electrical connection to the main detection unit Mu1. Iu3 provides an electrical connection to the control housing, FIG. 5. Iu4 provides an electrical connection to the laser detection diode placed in the front of the vehicle. Iu5 is an electrical connection from the laser detection diode placed on the rear of the vehicle. Iu6 is an electrical connection to the horn waveguide antenna placed on the rear of the vehicle.

The integration unit then sends these signals through separate wires, yet combined within a single wire loom, Iu2, to the main detection unit FIG. 2, Mu1. The integration unit FIG. 6 is a passive component, requiring no power for itself which simply allows for ease of connection from the various external antennas. Further, this integration unit allows the wires from the three antennas and the wires from the power connection to be joined within one single, small wire loom. This single wire loom is then sent from the integration unit to the detection unit from a provided plug Iu2. This not only simplifies the required wiring of the invention, but also necessitates the use of only one small wiring loom to the front of the vehicle, thus providing inconspicuous installation upon the vehicle. As above, the integration unit FIG. 6 shall be constructed in a sealed manner such that all internal components are protected from dirt and moisture.

As the physical and mental demands of a motorcycle operator are higher than those placed upon other vehicle operators, the functionality and control of a motorcycle mounted device must remain simple and efficient. The present invention provides the needed increased safety, efficiency, and control through the use of a single simple control component, manufactured and implemented such that the driver may easily control the invention without averting unnecessary attention to its operation. The control housing is depicted in FIG. 5 and shall be constructed such that it may be mounted to the motorcycle handlebars. FIG. 5, Ch1 shall be mechanically joined to brace Ch4 by inserting machine screws Ch5 through the holes Ch6 in the brace Ch4. These screws Ch5 shall them be tightened in such a manner as to hold the control housing Ch1 firmly to the handlebar of the motorcycle.

In the preferred embodiment of the present invention, the control housing of FIG. 5 shall be mounted immediately to the right of the handgrip on the left handlebar of the motorcycle. This mounting location allows for easy and safe operation of the invention as the motorcycle driver may operate the invention solely with his/her left thumb. Further, this location allows the operator to control the invention without moving his/her hand from the handgrip, thus maintaining maximum safety and control over the vehicle.

The control housing shown in FIG. 5 allows for simple, safe control of the present invention while demanding a minimum of attention from the vehicle operator. Switch Ch2 allows the operator to switch the invention from a Highway to a City mode, and vice versa. The Highway functionality provides maximum sensitivity to all three microwave bands to which the detection unit is sensitive. The City mode provides a functionality of decreased sensitivity to the X band of the microwave region. This region is known in the prior art to cause numerous false alerts due to several other devices operating in this region. The motorcycle operator can thus easily switch between the two modes, according to their current environment.

The control housing shown in FIG. 5 further allows for a Sleep/Off functionality. This button Ch3 allows the operator to push the button quickly in order to temporarily turn off all alarm-indicating light emitting diodes, Mu3 through Mu7. These diodes will remain off for a period of time as specified by the microprocessor in the main detection unit. In the preferred embodiment of this invention, this time period will be 1 minute. This time allows for the motorcycle operator to pass through an area where microwave signals of the X Ka or Ka-wideband frequencies have been detected without being distracted by a constant alarm signal given from the light emitting diodes. This feature increases safety and control of the vehicle as the driver will not be unnecessarily distracted, while maintaining proper functionality of the invention. Further, this feature protects against inadvertent shut-offs as the operator may turn off a radar detection unit so that they are not distracted and then forget to turn it back on.

The control housing shown in FIG. 5 further allows for an Off functionality on the same button Ch3 as the Sleep functionality is provided. This function is initiated when the operator holds the Sleep/Off button Ch3 for 3 seconds or longer. When this button is held for 3 seconds or longer, the microprocessor of the main detection unit initiates a shutdown of the system. This allows the operator to completely turn off the system if desired, without having to unhook the power wires to the main detection unit. Further, this functionality lasts only as long as the vehicle is currently running. When the vehicle is turned off and then back on again, the present invention will again power up as normal. This functionality protects the operator from inadvertently forgetting to turn on the invention after a shutdown. As above, the control housing shall be constructed in a sealed manner such that all internal components are protected from water and dirt.

In the preferred embodiment of the invention an individual would first install the main detection unit FIG. 2 atop the motorcycle speedometer or RPM indicator. This installation is made semi-permanent by either tightening a thin ring fastener Mu8 between the housing and the face of the indicator Mu2, or passing the indicator housing screw through the bracket Mu9 and tightening, or both. Additional mounting techniques are easily imaginable depending upon the style of the motorcycle. However, it is essential the invention is placed atop the gauge cluster in a semi-permanent manner using either bolts or screws, thus providing maximum visibility, safety, durability, and security from theft or damage.

Next, in the preferred embodiment, the operator will install the optional rear radar detection unit FIG. 3 on the rear of the vehicle. This unit will be mounted underneath the rear fender, underneath or atop the rear taillight cluster, or anywhere else to the rear of the vehicle that does not impede normal and safe operation of the vehicle. The operator will next install one of the optional laser detection devices FIG. 4. The device may be mounted above or around the license plate area or taillight area, thus ensuring maximum usability. The device may be mounted in any manner possible in this area provided it does not hinder normal and safe operation of the vehicle. Additionally, the operator will now install the second laser detection device to the front of the vehicle. A location near or underneath the headlights of the vehicle is preferred to maximize usability, however anywhere on the front of the vehicle is sufficient provided the mounting does not hinder normal or safe operation of the vehicle.

Next, in the preferred embodiment, the operator will mount the control housing to the left handlebar of the motorcycle. The housing shall be mounted directly to the right of the handgrip such that the motorcycle driver may operate all buttons with the thumb of his/her left hand with little or no movement of the driver's hand from the handgrip. Further, the control housing shall be constructed in such a compact, thin manner as to require very little or no movement of the stock controls from their stock position. The control housing shall further be constructed with thin layers of double-sided industrial strength tape placed on the inside of brace Ch4 and housing Ch1. This tape will bond to the handlebar of the motorcycle as the housing is mounted and tightened together, thus requiring no drilling or permanent alteration to the handlebars to ensure the housing does not rotate or shift from its mounted position.

Next, in the preferred embodiment of the present invention, the operator will mount the integration unit FIG. 6 underneath the driver or passenger seat, or anywhere else on the vehicle allowing concealment and moderate access to the battery enclosure. The integration unit will then be bolted down through a pre-existing hole or affixed using industrial strength double sided tape on the bottom of the case. The wires from the external detection units and the control housing can now be routed in a concealed manner to the integration unit and plugged into the unit in the appropriate place. In the preferred embodiment of the invention, the wires from the external antennas and control housing will be terminated with a universal 2.5 mm jack or some other plug allowing easy and weather resistant connectivity. Thus the present invention achieves the ability to be modular, easily reconfigurable, and weather resistant.

Further, functionality of the preferred embodiment is achieved as described previously through the use of a super heterodyne receiver configuration. As a signal is received on one of the antennas, either internal or external, an electrical signal is passed to the main detection unit electronics. As the electronics in this main detection unit determine the validity and strength of the signal, the appropriate light emitting diode will begin to blink at a rate corresponding to signal strength.

For instance, if the detected signal is found to be a weak laser signal from the rear of the vehicle, LED Mu7 will begin to blink slowly and the lower half of Mu5 will light up. If the signal strength decreases to a negligible amount, the display will return to no LEDs lit. However, if the signal increases in strength, the rate of blinking of the LED will continue to increase. The blinking rate therefore helps the driver quickly determine the strength of the incoming signal while diverting very little attention to the unit. Further, continued monitoring of the signal is automatic and requires no additional input from the user. As the indicator LEDs Mu3 through Mu7 all emit different colors, the driver is not required to read or divert attention to tiny letters or displays, as in the prior art, in order to determine the frequency of the incoming signal. As the operator becomes familiar with the color indications, only a very short glance will be necessary to determine signal frequency.

As the present invention is operated from the vehicle power source, the preferred embodiment achieves a further improvement over prior art as the user will never need to change portable batteries. Further, this voltage source allows the unit to always run as long as the vehicle is running, thus the operator is protected from inadvertently leaving power off from the system. Additionally, as the unit will never need to be removed to change batteries, and as the invention is resistant to water and dirt, it may be affixed in a semi-permanent manner. This is a vast improvement over temporary mounting methods described in the previous art as security and durability are increased.

The preferred embodiment of the present invention thus provides increased safety, security, efficiency, ease of operation, usability, concealment, and durability over prior art. Further, the present invention is universal to all known motorcycle types, requires no permanent alteration to the vehicle, and provides unimpeded operation of the vehicle while increasing visibility and effectiveness over the prior art.

What is claimed is:

1. A police radar and laser detection device including:
   a. an internal antenna which receives X, Ka, and Ka-wideband microwave signals
   b. an external, electrically connected antenna which receives X, Ka, and Ka-wideband microwave signals
   c. two external, electrically connected light sensitive diode antennas which receives laser signals in the range between 820 and 950 nm
   d. a visible means for providing an alarm signal with automatic display intensity control
   e. a control module
   f. an integration unit for combining wiring into a single loom for connection to the main detection unit.

2. A police radar and laser detection device as claimed in claim 1 for semi-permanent mounting upon a motorcycle and running from the electrical system of said motorcycle, consisting of:
   a. a main detection unit designed for mounting to a motorcycle speedometer or RPM indicator and constructed to be water resistant
   b. external radar and laser detection antennas constructed to be water resistant and adapted for mounting inconspicuously to a motorcycle
   c. a wiring integration unit constructed to be water resistant and adapted for mounting inconspicuously to a motorcycle
   d. a control housing constructed to be water resistant and adapted for mounting to the handlebars of a motorcycle.

3. A police radar and laser detection device as claimed in claim 2 requiring no permanent alterations to the vehicle and further including:
   a. the main detection unit comprised of:
      i. antenna array which receives X, Ka, and Ka wideband signals
      ii. a super heterodyne receiver and a microprocessor programmed to control the visible alarm signals
      iii. visible alarm signals consisting of an array of six light emitting diodes of different colors; four of which are used to indicate the specific frequency detected, the other two used to indicate relative direction of origin of the detected signal
   b. the control module comprised of:
      i. one switch used to change the sensitivity mode of the main detection unit from City to Highway mode and vice versa
      ii. one button used to temporarily turn off the light emitting diode array if pushed quickly, and used to turn off entirety of the radar detection unit until restarting of the vehicle if held for three seconds or longer.

* * * * *